United States Patent
Simske et al.

(10) Patent No.: US 8,453,941 B2
(45) Date of Patent: Jun. 4, 2013

(54) SECURITY CAMPAIGN AND METHOD OF CREATING THE SAME

(75) Inventors: Steven J Simske, Fort Collins, CO (US); Shawn J Gibson, Albany, OR (US); David S Kellar, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 75 days.

(21) Appl. No.: 13/125,780

(22) PCT Filed: Oct. 24, 2008

(86) PCT No.: PCT/US2008/081158
§ 371 (c)(1),
(2), (4) Date: Jun. 24, 2011

(87) PCT Pub. No.: WO2010/047719
PCT Pub. Date: Apr. 29, 2010

(65) Prior Publication Data
US 2011/0248090 A1  Oct. 13, 2011

(51) Int. Cl.
*G06K 19/06* (2006.01)
*G06K 7/10* (2006.01)

(52) U.S. Cl.
USPC .............. 235/494; 235/462.09; 235/462.1

(58) Field of Classification Search
USPC ................. 235/494, 462.09, 462.1
See application file for complete search history.

(56) References Cited

U.S. PATENT DOCUMENTS

| | | | | |
|---|---|---|---|---|
| 6,394,358 | B1 * | 5/2002 | Thaxton et al. | 235/494 |
| 7,510,125 | B2 * | 3/2009 | Look | 235/494 |
| 7,564,605 | B2 * | 7/2009 | Lapstun et al. | 358/539 |
| 2003/0215112 | A1 * | 11/2003 | Rhoads et al. | 382/100 |
| 2005/0067497 | A1 * | 3/2005 | Jones et al. | 235/492 |
| 2005/0179955 | A1 * | 8/2005 | Shovgenyuk et al. | 358/3.28 |
| 2005/0285761 | A1 * | 12/2005 | Jancke | 341/50 |
| 2006/0226244 | A1 | 10/2006 | Boitsov et al. | |
| 2007/0152060 | A1 * | 7/2007 | Kiliccote | 235/462.09 |
| 2009/0302123 | A1 * | 12/2009 | Lugt et al. | 235/494 |
| 2010/0224687 | A1 * | 9/2010 | Hiroyoshi | 235/494 |
| 2011/0192906 | A1 * | 8/2011 | Wilds et al. | 235/468 |

FOREIGN PATENT DOCUMENTS

| | | | |
|---|---|---|---|
| JP | 05054214 | A | 3/1993 |
| JP | 10283446 | A | 10/1998 |

OTHER PUBLICATIONS

International Search Report and written opinion; mailing date: Apr. 24, 2009; PCT/US2008/081158.

* cited by examiner

*Primary Examiner* — Thien M Le
*Assistant Examiner* — Claude J. Brown

(57) ABSTRACT

A method for creating a security campaign includes generating, via a first source, a first security deterrent for at least one non-security purpose; and generating, via a second source, a second security deterrent for a security purpose. The first and second deterrents are incorporated into a single security campaign.

18 Claims, 5 Drawing Sheets

SECURITY CAMPAIGN AND METHOD OF CREATING THE SAME

BACKGROUND

The present disclosure relates generally to security campaigns and methods of making the same.

Security printing and publishing is an important component of product differentiation, tracking and authenticating, as well as of copy prevention or anti-counterfeiting initiatives. Security printing involves providing each package with a unique ID printed thereon, in the form of, for example, a deterrent or mark. An overall set of deterrents used on a product/package is the security campaign. The unique identifiers in the security campaign may be overt and/or covert, and may contain authenticable data. Such deterrents may be read and subsequently authenticated using imaging equipment, such as scanners, cameras, inspection systems, or the like. Since unique identifiers compete with branding, sales information, or other product information for real estate on the packaging, it may also be desirable to include multiple levels of security and functionality.

BRIEF DESCRIPTION OF THE DRAWINGS

Features and advantages of embodiments of the present disclosure will become apparent by reference to the following detailed description and drawings, in which like reference numerals correspond to the same or similar, though perhaps not identical, components. For the sake of brevity, reference numerals having a previously described function may or may not be described in connection with subsequent drawings in which they appear.

DETAILED DESCRIPTION

Embodiments of the security campaign disclosed herein incorporate at least two deterrents, one of which is used for at least one non-security purpose and the other of which is used for a security purpose. The deterrent used for non-security purposes may be non-payload indicia for the other security deterrent(s) on the image. This advantageously allows the security deterrents that are used for encoding/encrypting of information to have greater information density, since they do not require their own size, color, skew, orientation and/or warp calibration. The deterrent used for the non-security purposes may also have payload information embedded therein, and thus may be an insurance deterrent to be used in cases of recall, audit, or when additional forensic analysis is desirable. The two deterrents are generated via different sources, and thus any payload information embedded in such deterrents is unknown to the other deterrent generating party. This provides an additional level of security, at least in part because it forces the reader to utilize the same security backend as the print job creator.

Figure 1:
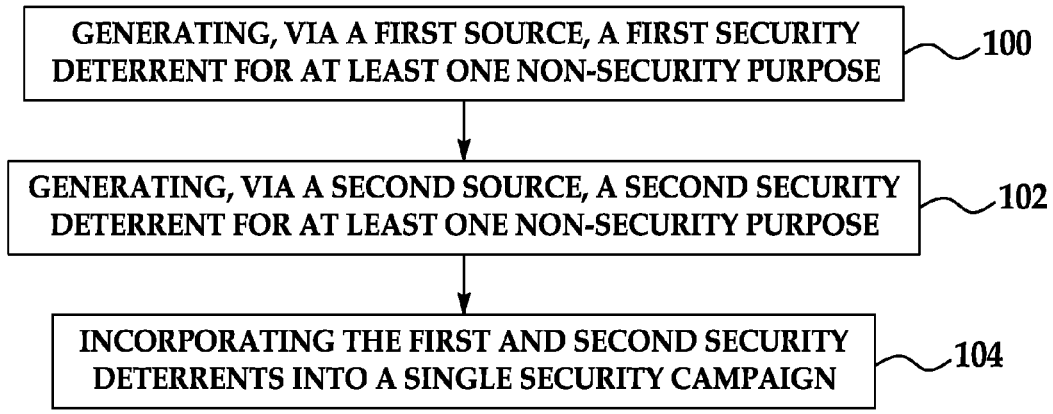
FIG. 1 is a flow diagram of an embodiment of a method for creating a security campaign.

Referring now to FIG. 1, an embodiment of the method for creating an embodiment of the security campaign is depicted. Generally, the method includes generating, via a first source, a first security deterrent for at least one non-security purpose, as shown at reference numeral 100; generating, via a second source, a second security deterrent for a security purpose, as shown at reference numeral 102; and incorporating the first and second deterrents into a single security campaign, as shown at reference numeral 104. Embodiments of the method will be discussed further hereinbelow in reference to the other Figures.

Figure 2:
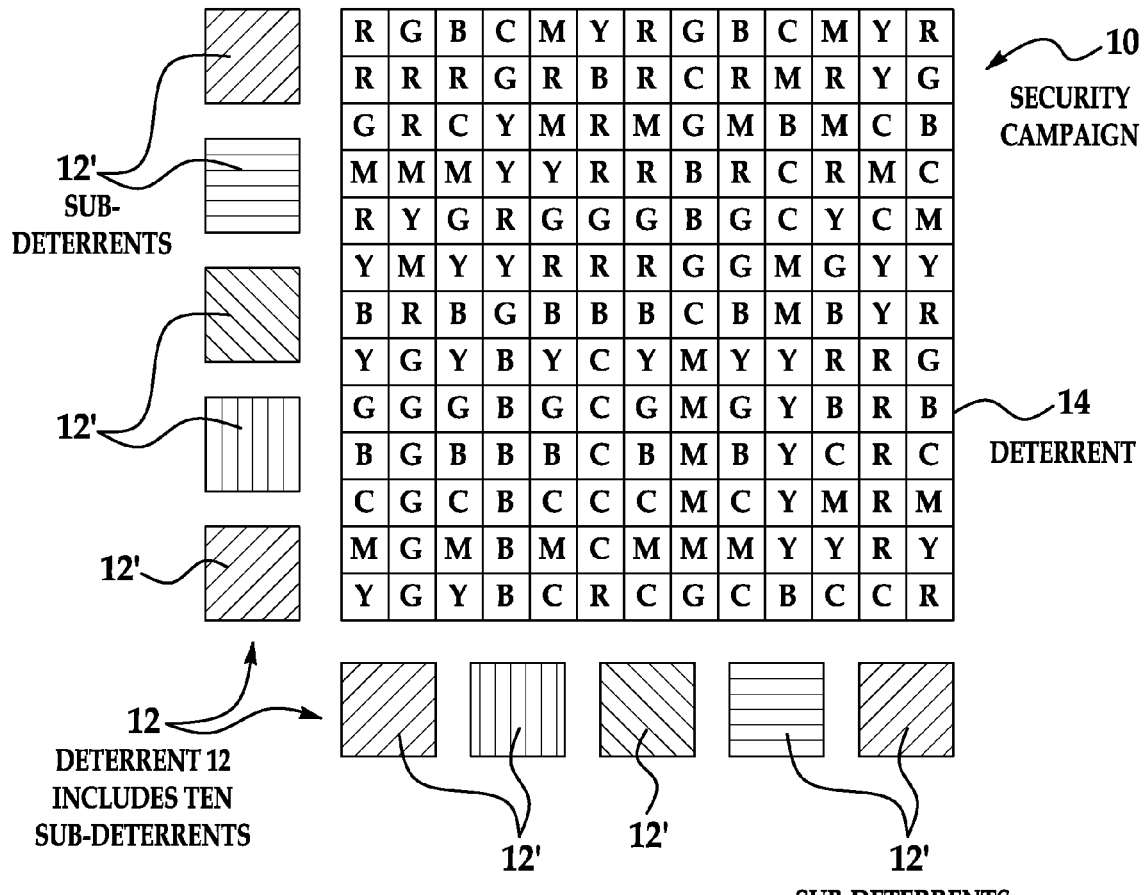
FIG. 2 is a semi-schematic view of an embodiment of a security campaign.

FIG. 2 illustrates one embodiment of a security campaign 10. As previously mentioned, the security campaign 10 includes at least two deterrents 12, 14. Non-limiting examples of suitable deterrents 12, 14 include color bars, color tiles, guilloche patterns, concentric black/white rectangle patterns, 2-dimensional barcodes, modulation transfer function (MTF) patterns, tile patterns, color lines, fingerprint patterns, color text, copy detection patterns (CDP), letter sequences, number sequences, graphic sequences, target patterns, or the like, or combinations thereof. In some instances, the deterrent 12, 14 is a combination of sub-deterrents 12' or 14' incorporating a plurality of different deterrent patterns (see deterrent 12 in FIG. 2 or deterrent 14 in FIG. 4B). While the deterrent 12 used in the examples herein is shown as including sub-deterrents 12', it is to be understood that the deterrent 12 may be a single deterrent.

As previously mentioned, one of the deterrents 12 is utilized for at least one non-security purpose. This non-security purpose may be for calibration of the other deterrent 14, or for authentication during a recall (i.e., when counterfeits have been found in the supply chain), or an audit, or when additional forensic analysis is desirable. A "non-security purpose deterrent" is a deterrent 12 that does not have information embedded therein (i.e., non-payload indicia) or has information embedded therein that is unknown to the creator/source/generator of the other deterrent 14 when the security campaign 10 is deployed.

When the deterrent 12 is used for calibration of the deterrent 14, the person/entity generates the deterrent 12 and sends it to the person/entity generating the deterrent 14. The creator/source of the deterrent 14 may receive the deterrent 12 in an electronic format, and then add the deterrent 14 to this format to create the security campaign 10. It is to be understood that various workflows may be utilized. As another non-limiting example, the data associated with the creation of deterrent 14 is sent to the algorithm/executable used to create deterrent 12 and is used there to create the deterrent 12, which is separate from and unexplained to the creator of deterrent 14. This enables the plausible deniability between the two deterrent 12, 14 creators.

When generating the deterrent 14, the creator/source of the deterrent 14 utilizes the deterrent 12 for calibrating the deterrent 14. The deterrent 12 may provide for the deterrent 14 absolute size calibration, absolute orientation calibration, absolute skew calibration, absolute warp calibration, color calibration, or combinations thereof. It is to be understood that when used for calibration purposes, the deterrent 12 is configured in the same manner (i.e., same size, orientation, skew, warp, and color(s)) each time the security campaign 10 is deployed, regardless of the size (and thus payload density) of the other elements (e.g., deterrent 14) of the security campaign 10. This advantageously achieves a consistent security campaign 10 from object to object.

When the deterrent 12 is used to calibrate the deterrent 14, the deterrent 14 need not include any non-payload indicia dedicated to calibration. As such, the deterrent 14 may have a larger payload density than deterrents having their own size, orientation, skew, warp and/or color calibration. For example, in FIG. 2, each color tile may have information embedded therein.

In the non-limiting example shown in FIG. 2, the deterrent 12 is a line-based deterrent including ten sub-deterrents 12' which together form an "L" shape. In this example, the configuration of the sub-deterrents 12' forms the deterrent 12 which is used at least for absolute size calibration of the deterrent 14. The deterrent 12 is always printed at the same size, thereby providing exact sizing calibration for the deterrent 14. As another example, the "L" shape may also always be printed with the same orientation in the campaign 10, thereby providing exact orientation calibration for the deterrent 14.

It is to be understood that the creator/source of the deterrent 14 may rearrange and/or otherwise alter the sub-deterrents 12' so that the deterrent 12 has desirable properties for calibrating the size, orientation, skew and/or warp of other deterrent 14. For example, the "L" shaped deterrent 12 shown in FIG. 2 may be rotated 180° so that it borders the upper right hand corner of the deterrent 14. If the creator/source of the deterrent 14 alters the deterrent 12, generally such changes are authorized by the creator/source of the deterrent 12. Furthermore, if the deterrent 12 is altered, it is to be understood that the altered deterrent 12 is then configured in same manner (i.e., same size, orientation, skew, warp, and color(s)) each time the security campaign 10 is deployed.

The deterrent 14 shown in FIG. 2 includes color tiles with a letter shown therein. These letters are representative of colors, where R=red, G=green, B=blue, C=cyan, Y=yellow, and M=magenta. It is to be understood that the deterrent 12 may also be printed in specific colors, affording color calibration for the deterrent 14.

In one non-limiting example, the deterrent 12 could be a smart hologram or a flex color-shifting deterrent, which provides overt protection using two colors in combination. Each of these types of deterrents provides color travel, where there are two colors in the deterrent 12, and activating the deterrent 12 switches between the two colors. For the smart hologram, the color change is induced by carbon dioxide (e.g., breathing on the deterrent 12), humidity (e.g., wetting the deterrent 12) or some other chemical trigger (depending on the construction of the deterrent 12). For the flex deterrent, the color change is induced by the angle of observation (e.g., by flipping the deterrent 12 left to right).

In these instances, the color deterrent 12 is used instead of including non-payload color calibrating indicia in the deterrent 14. As a non-limiting example, in FIG. 2, the sub-deterrents 12' could be smart holograms switchable between red and green. This deterrent 12 is used for the color calibration of red (R) and green (G) color tiles of the deterrent 14, thereby allowing the R and G indicia (e.g., in the upper left corner of the deterrent 14) to have information embedded therein, instead of being used as non-payload calibration indicia. The images of the smart hologram (before and after activation) may be analyzed and used for the R and G calibration of the deterrent 14. The colors of the deterrent 12 are matched to the R and G printed colors of the color tile deterrent 14 both before and after transformation of the deterrent 12.

In some instances, a flex deterrent may not exhibit enough color travel to provide non-payload indicia for two colors, but it can provide non-payload indicia for one color. In some instances, the smart hologram may also provide non-payload indicia for one color, for example, if the deterrent 14 is calibrated before or after transformation, but not both.

Figure 3A:
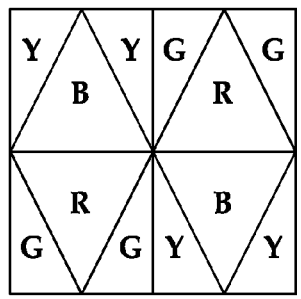
FIGS. 3A and 3B together depict a semi-schematic view of a security deterrent exhibiting color travel properties.
Figure 3B:
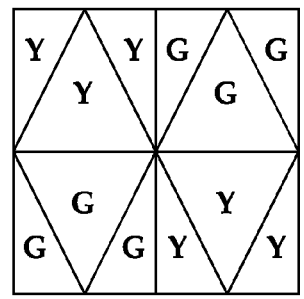

FIGS. 3A and 3B illustrate still another example of integrating the color travel into the deterrent 12. As shown in FIG. 3A, the non-activated overt deterrent includes one or more foreground sections (labeled B and R) that exhibit different colors than the colors of the corresponding background sections (labeled Y and G). Upon activation, as shown in FIG. 3B, those foreground sections then change and match the corresponding background sections. It is to be understood that any shape and/or color foreground/background combinations may be accommodated. In FIGS. 3A and 3B, the red foreground sections convert to green and the blue foreground sections convert to yellow.

Figure 4A:
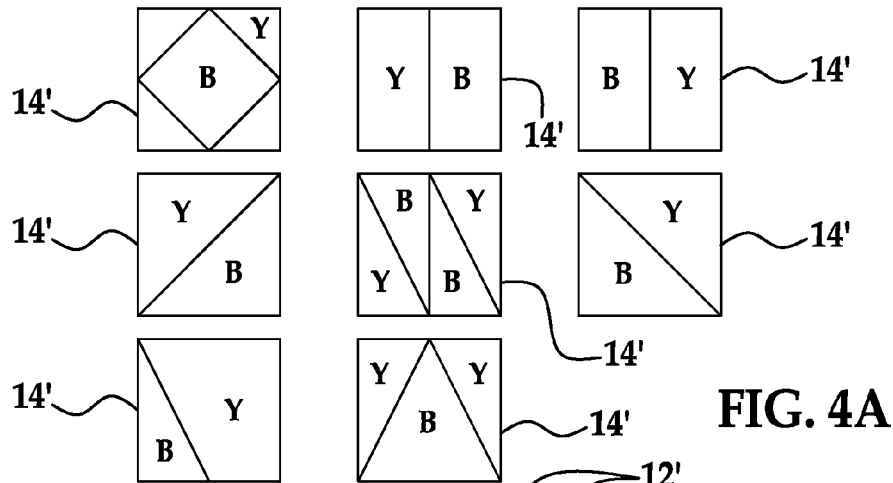
FIG. 4A is a semi-schematic view of various security deterrent patterns.
Figure 4B:
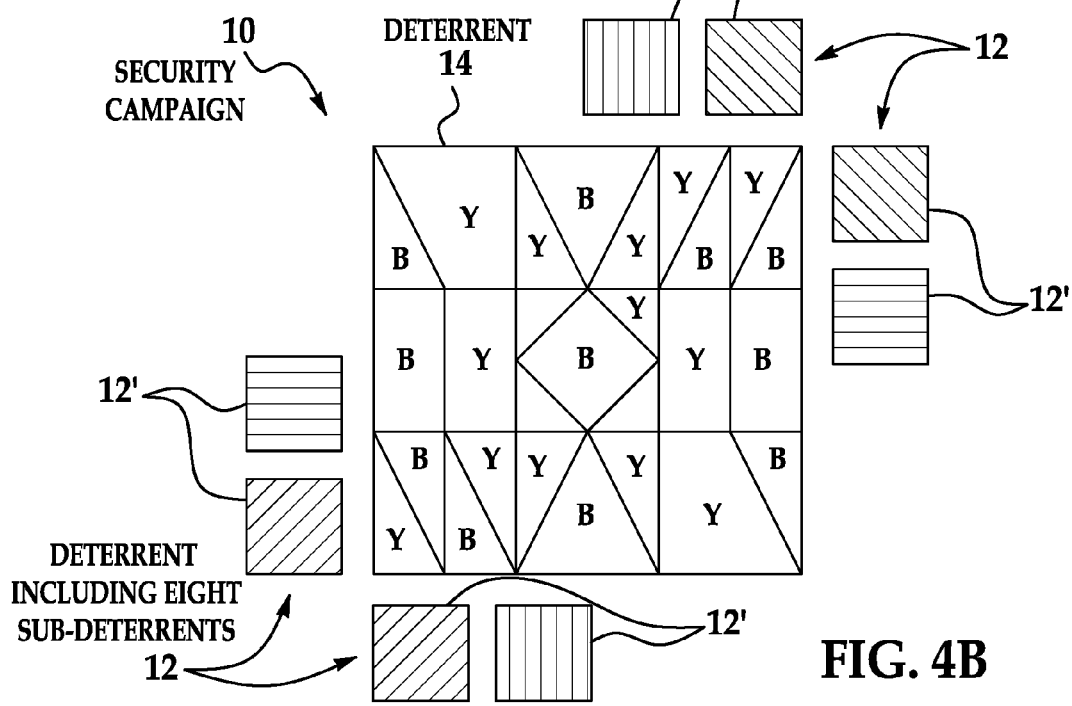
FIG. 4B is a semi-schematic view of an embodiment of a security campaign including one deterrent including a plurality of the security deterrent patterns of FIG. 4A.

Referring now to FIGS. 4A and 4B, as previously mentioned, either of the deterrents 12, 14 may be made up of a plurality of sub-deterrents 12', 14' that have different patterns. Non-limiting examples of the sub-deterrents 14' are shown in FIG. 4A. As depicted, each of the sub-deterrents 14' has a different pattern. In this example, the patterns are defined with different colors (e.g., blue B and yellow Y). As shown in FIG. 4B, any number of the sub-deterrents 14' may be combined together to form the final deterrent 14 that is included in the security campaign 10. Furthermore, the patterned sub-deterrents 14' may also be rotated to achieve a slightly different pattern.

In the example shown in FIG. 4B, the deterrent 12 includes eight sub-deterrents 12' arranged in a different manner than that shown in FIG. 2. It is to be understood that the configuration of the sub-deterrents 12' in this example provides at least size orientation for the embodiment of the deterrent 14 shown.

Figure 5A:
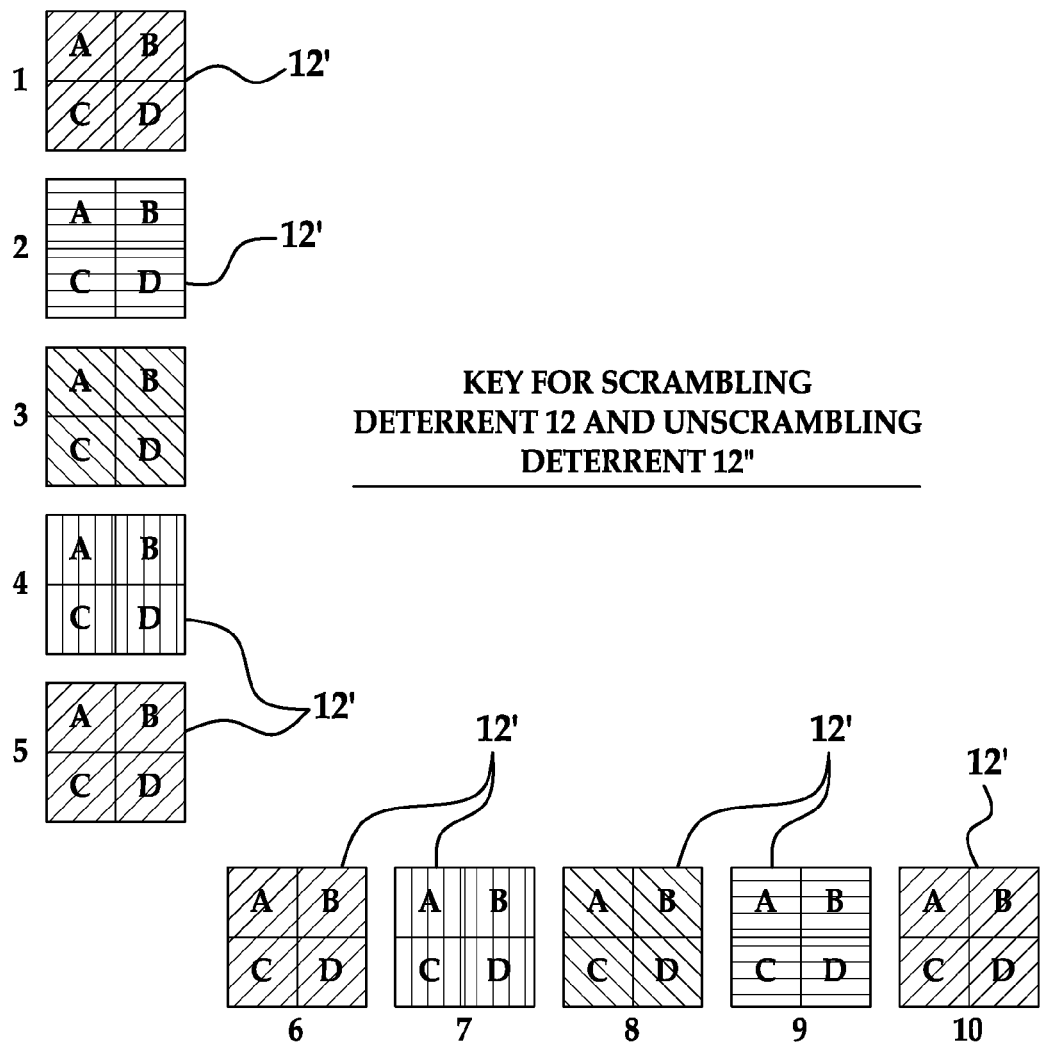
FIG. 5A is a semi-schematic view of a deterrent and a key for scrambling the deterrent.
Figure 5B:
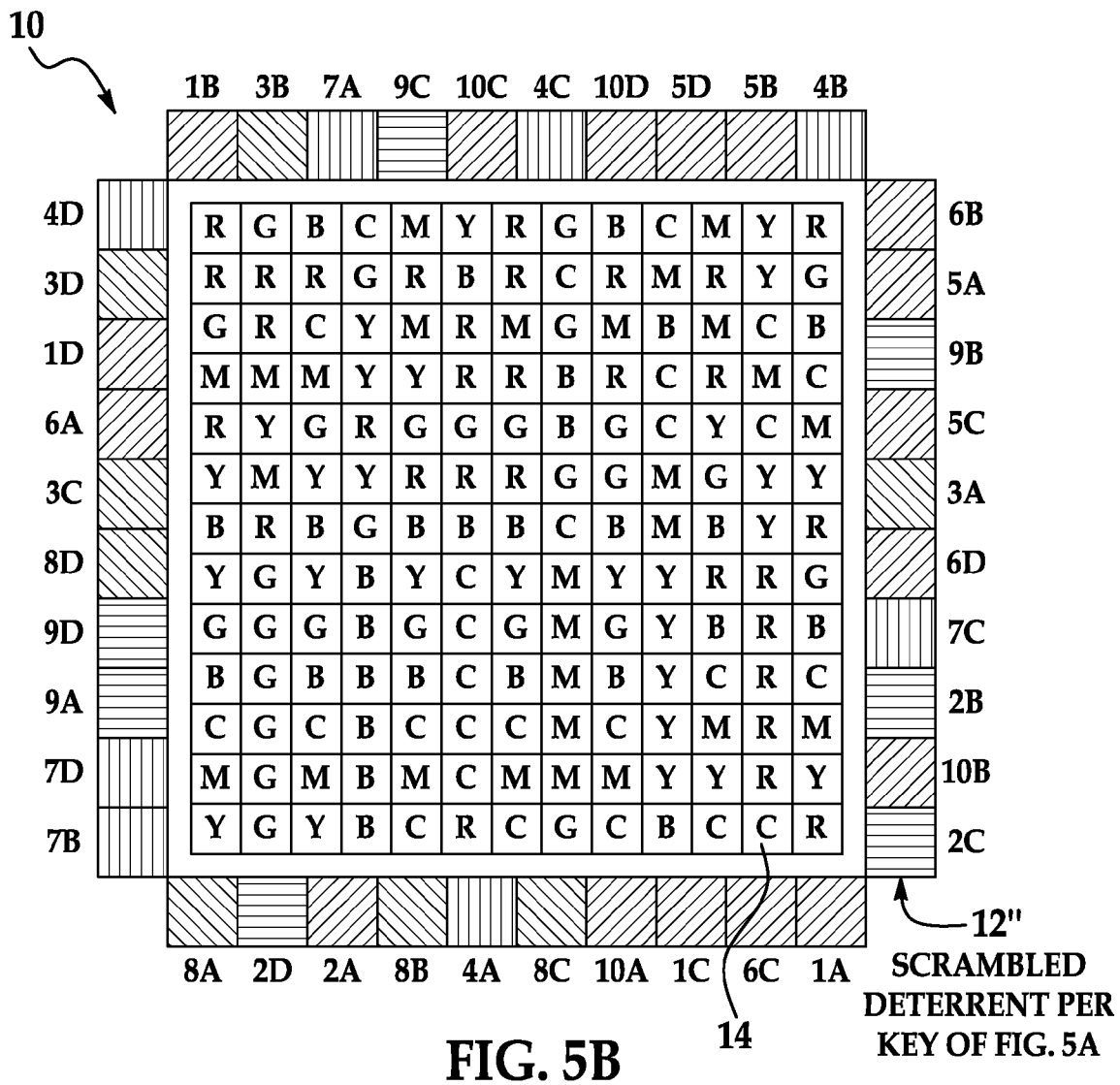
FIG. 5B is a semi-schematic view of an embodiment of a security campaign including a scrambled deterrent which can be unscrambled using the key of FIG. 5A.
Figure 5C:
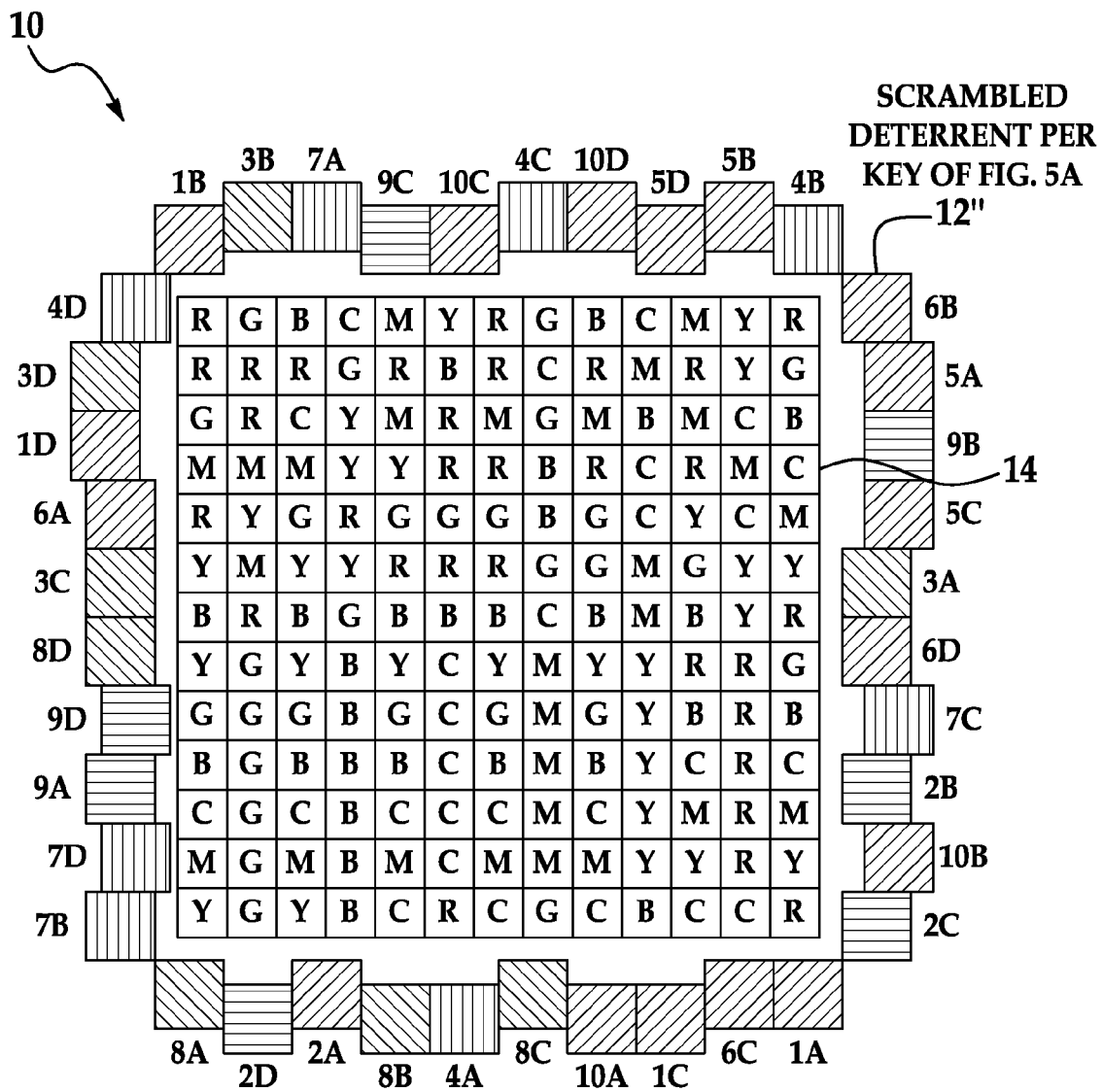
FIG. 5C is a semi-schematic view of another embodiment of a security campaign including a scrambled deterrent which can be unscrambled using the key of FIG. 5A.

FIGS. 5B and 5C illustrate other embodiments of the security campaign 10 in which the deterrent 12 is rearranged and printed as deterrent 12", and FIG. 5A illustrates an example of the key used to scramble and unscramble (when necessary) the deterrents 12, 12", respectively. When the deterrent 12 is rearranged, generally the creator/source of the deterrent 14 performs such rearrangement. This may be accomplished, for example, to provide an additional level of security to the campaign 10, to increase the amount of information that can be encoded in the campaign 10, or combinations thereof. Both parties have, in effect, a private key or series of keys they own to dictate how their deterrents 12, 14 are created. In some instances, the unique stream from each deterrent 14 is used to create a unique instance of deterrent 12.

Referring now to FIG. 5A, a non-limiting example of a key for rearranging the deterrent 12 of FIG. 2 is depicted. In this particular example, each sub-deterrent 12' of the deterrent 12 is labeled (e.g., A, B, C, etc.), and divided into multiple pieces. The individual pieces are then also labeled (e.g., 1, 2, 3, 4, etc.). The labeled pieces may be rearranged in any desirable manner to form the scrambled/rearranged deterrent 12" (examples of which are shown in FIGS. 5B and 5C). Generally, the pieces are placed independently in the security campaign 10, and are sequenced in any desirable order. In some instances, the pieces are rearranged such that the deterrent 12" still provides the desirable calibration for the deterrent 14. As a non-limiting example, if each piece were 1 cm thick, the pieces could be arranged to form a 1 cm thick border on all four sides of the deterrent 14 (see FIG. 5B, which may not be exactly to scale with the dimensions discussed herein), as opposed to a 2 cm thick border on two sides of the deterrent 14 (see FIG. 2, which may not be exactly to scale with the dimensions discussed herein).

As shown in FIG. 5C, the rearranged deterrent 12" may be embedded into an accommodating background. This enables additional bits of information to be added to the rearranged deterrent 12", if desirable. For example, in FIG. 5C, the pieces are offset against an accommodating background to allow further overt security, and add 1 bit of information to each of the 40 pieces. In this example, the depicted offset is approximately ¼ of the size of the piece, meaning the overall boundary is 25% wider than the embodiment of the deterrent 12" shown in FIG. 5B. The accommodating background is usually an extension of the patterning in the individual pieces, making the precise pattern to be authenticated more difficult to ascertain.

An accommodating background is ambiguating, thereby making it harder to guess what the individual pieces are. The offset pieces are one part of the extended background, and thus without knowing the background, one cannot determine the offset and appropriately piece together the overall piece-wise-printed deterrent 12". The ambiguating sections may cover the range any individual piece can cover, and thus may be piecewise ambiguating.

While the labels (1A, 2A, 3A, etc.) of the pieces are shown in FIGS. 5A and 5B, it is to be understood that such labels are shown to facilitate understanding, and that such labels are not printed in the final security campaign 10. In fact, the key to the rearrangement of the deterrent 12" is maintained in secret until it is desirable to authenticate the object (upon which the security campaign 10 is printed), until a recall or audit event occurs, or until additional forensic analysis (beyond reading deterrent 14) is desirable. Such a key may be stored in a registry (discussed further hereinbelow) as being associated with the final security campaign 10. As such, the unscrambling or re-stitching order of the pieces is neither readily apparent nor readily ascertainable to a would-be counterfeiter.

In the embodiments disclosed herein, the security deterrent 14 includes information embedded therein. It is to be understood that whether or not the deterrent 12, 12" is used for calibration, the deterrent 12, 12" may also include information embedded therein. Any information encoded in the deterrent 12, 12" remains unknown to the creator/generator of the deterrent 14 upon deployment of the security campaign 10. Maintaining the secrecy of such information from the creator/generator of the deterrent 14 will require a reader (of the deterrent 12, 12") to consult the creator/source of the deterrent 12, 12", or a registry which has the security campaign 10 and information associated therewith stored therein. It is to be understood that any key deployment scheme may be used here. Generally, the information encoded in the deterrent 12, 12" is not used as a first line of defense for security purposes, but rather is revealed in the event of a recall, an audit, or when additional forensic analysis (in addition to reading the security information of deterrent 14) is desired.

The information encoded in the deterrent 14 or the deterrents 12, 14 may be, for example, a code; a sequence of bits, bytes, characters, colors, graphics, numbers, etc.; a watermark; symbols; interpretable information; a fingerprint(s); other biometric data (e.g., encoded, encrypted, scrambled, chained to other information); a "payload"; modulation transfer functions (e.g., used in conjunction with a target pattern); or the like; or combinations thereof.

In one embodiment, any information encoded in the deterrent 14 is selected by the creator/source of the deterrent 14. In another embodiment, a separate owner may choose which deterrent 14 to use, and thus which paired-deterrent structure to invoke. Any information encoded in the deterrent 12, 12" is ultimately selected by the creator/source of the deterrent 12, 12" and is unknown to the creator/source of the deterrent 14 (at least at the time of deployment of the campaign 10 and until a time when it is desirable to reveal such information). In some instances, after using the deterrent 12, 12" to calibrate the deterrent 14, the creator/source of the deterrent 14 may transmit the security campaign 10 back to the creator/source of the deterrent 12, 12" with a suggested data stream for their deterrent 12, 12". The creator/source of the deterrent 12, 12" may then encode all or a predetermined portion of the data stream into their deterrent 12, 12", alter all or a predetermined portion of the data stream and encode the altered version into their deterrent 12, 12", or ignore the data stream. As previously mentioned, the manner in which the data stream is or is not encoded into the payload of the deterrent 12, 12" is unknown to the creator/source of the deterrent 14.

It is to be understood that when the deterrent 12, 12" is used solely for calibration purposes (i.e., deterrent 12 has no information embedded therein), either the creator/source of the deterrent 14 (having information embedded therein) or a third party printer may be used to print the security campaign 10.

In an embodiment when both deterrents 12, 14 include information embedded therein, printing of the security campaign 10 is accomplished via a third party printer. This printer is utilized to ensure that any information embedded in the respective deterrents 12, 14 remains independent and unknown to the other deterrent generating source. The third party printer is an entity trusted by both the deterrent creators/sources. The third party printer is privy to any embedded codes/information, any keys to scrambled deterrents 12", and any other information related to the to-be-printed security campaign 10. The embedded information is generally sent separately to the third party printer from each of the creators/sources. When the deterrent 12, 12" is used solely for calibration of the deterrent 14, the final layout of the security campaign 10 is sent from the creator/source of the deterrent 14, which dictates how the deterrent 12, 12" is used for calibration.

In other instances, the deterrent 12, 12" creator receives deterrent 14 and determines how to create deterrent 12, 12" as a result of the data stream handed off to it by the creator of deterrent 14. As such, the two deterrents 12, 12", 14 may be linked together 12, 12", 14 without the creator/source of deterrent 14 knowing how the deterrents 12, 12", 14 are linked. In this example, printing may be accomplished via the source/creator of deterrent 12, 12" or a third party printer.

The third party printer may transmit the security campaign details to a backend secure server or registry, which maintains a record of the security campaign 10. Each source/creator may transmit the security campaign details to the backend secure server or registry. For example, when creator/source of deterrent 12, 12" uses deterrent 14 for encoding, in order to validate the proper encoding of deterrent 12, 12" by deterrent 14 for auditing, compliance, comparing records, etc., creator/source of deterrent 12 may verify for the registry that deterrent 14 encoded the correct instance of deterrent 12, 12" for each deterrent 14.

Figure 6:
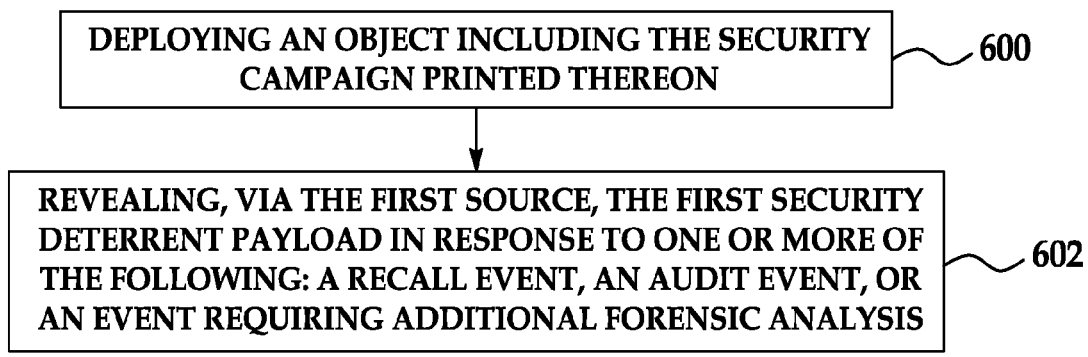
FIG. 6 is a flow diagram of an embodiment of a security campaign method after an object including an embodiment of the security campaign is deployed.

The security campaign 10 is printed on the object (not shown), and the object is deployed (shown as reference numeral 600 in FIG. 6). It is to be understood that the term "object" as used herein is to be interpreted broadly and may include, but is not limited to, any type of object, product, document or package. Likewise, the term "package" is to be interpreted broadly herein to include any unit for containing a product, displaying a product, or otherwise identifying a branded good. Non-limitative examples of such packages include boxes, bags, containers, clamshells, bands, tape, wraps, ties, bottles, vials, dispensers, inserts, other documents, or the like, or combinations thereof.

When object authentication is desired, an image of at least the security campaign 10 is captured. The captured image is generally in digital format, and is collected using an electronic device. The electronic device may be a digital camera. It is to be understood that the digital camera may be embodied in, for example, a cellular phone, a personal digital assistant, or the like. Another suitable electronic device is a scanner, an inspection camera, a tabletop imager, or the like.

The digital image of the security campaign 10 is then transmitted from the electronic device to any processing unit (having an associated program memory and analysis code loaded therein), where all information is extracted from the security deterrent 14 in the image. If applicable, such information is decoded, decrypted and/or unscrambled, and here may be associated with the registry. Once the security deterrent 14 and the information contained therein are analyzed, the object may be declared authentic or non-authentic, depending on the whether the extracted information matches that stored in the registry. If the security information in the deterrent 14 is accurate, the object may be declared authentic.

For routine authentication, it is to be understood that the deterrent 12, 12" is not read or re-stitched and read (if deployed as a rearranged deterrent). As shown at reference numeral 602 of FIG. 6, any information embedded in the deterrent 12, 12" is revealed in specific instances, for example, after a recall, during an audit, or when forensic analysis in addition to analysis of deterrent 14 is desirable. In such instances, the information embedded in the deterrent 12, 12" may be extracted and authenticated in the manner described hereinabove for deterrent 14. It is to be understood that the creator/source of the deterrent 12, 12" may verify the accuracy of the information extracted from deterrent 12, 12", for example, in instances when such information is not stored in a registry. Furthermore, when the rearranged deterrent 12" is utilized, it is to be understood that the key needs to be accessed (e.g., from the creator/source of deterrent 14 that rearranges deterrent 12) in order to reassemble the deterrent 12 for its authentication.

In the embodiments disclosed herein, multiple deterrents 12, 12", 14 are implemented together in a single security campaign 10, where at least one of the deterrents 12, 12" is used for non-security purposes. In some instance, the security campaign 10 advantageously offers multiple levels of security.

Clause 1. A method for creating a security campaign, comprising:
generating, via a first source, a first security deterrent for at least one non-security purpose;
generating, via a second source, a second security deterrent for a security purpose; and
incorporating the first and second deterrents into a single security campaign.

Clause 2. The method as defined in clause 1 wherein incorporating is accomplished by:
printing the first security deterrent in a predetermined manner such that the printed first security deterrent provides for the printed second security deterrent at least one of absolute size calibration, absolute orientation calibration, skew calibration, warp calibration, color calibration, or combinations thereof; and
printing the second security deterrent in a predetermined manner relative to the printed first security deterrent.

Clause 3. The method as defined in any of clauses 1 and/or 2, further comprising:
receiving, at the first source, a data stream from the second source; and
determining whether the data stream should be incorporated into the first security deterrent.

Clause 4. The method as defined in clause 3, further comprising:
deciding that at least a portion of the data stream should be incorporated into the first security deterrent; and
linking the at least the portion of the data stream to the first security deterrent in a manner that is unknown to the second source upon deployment of the security campaign.

Clause 5. The method as defined in any of clauses 1 through 4, further comprising:
dividing the first security deterrent into a predetermined number of pieces;
labeling each of the pieces;
rearranging the labeled pieces, thereby forming a scrambled first security deterrent; and
incorporating the scrambled first security deterrent into the single security campaign instead of the first security deterrent.

Clause 6. The method as defined in any of clauses 1 through 5 wherein generating the second security deterrent includes combining a plurality of security deterrent patterns together.

Clause 7. The method as defined in any of clauses 1, 2, 5 and/or 6, further comprising:
encoding a first data stream into the first security deterrent, the first data stream being unknown to the second source upon deployment of the security campaign; and
encoding a second data stream into the second security deterrent, the second data stream being known to the second source upon deployment of the security campaign.

Clause 8. A security campaign formed via the method of clause 1, the security campaign comprising:
the first security deterrent printed in a predetermined manner; and
the second security deterrent printed relative to the first security deterrent, the first security deterrent providing for the second security deterrent at least one of absolute size calibration, absolute orientation calibration, absolute skew calibration, absolute warp calibration, color calibration, or combinations thereof.

Clause 9. The security campaign as defined in clause 8 wherein each indicia of the second security deterrent is configured to be a payload indicia.

Clause 10. The security campaign as defined in any of clauses 8 and/or 9 wherein the first security deterrent has a data stream encoded therein in a manner that is unknown to the second source upon deployment of the security campaign.

Clause 11. A security campaign formed via the method of clause 1, the security campaign comprising:
the first security deterrent;
a payload encoded in the first security deterrent, the first security deterrent payload being known to the first source and unknown to the second source upon deployment of the security campaign;
the second security deterrent; and
a payload encoded in the second security deterrent, the second security deterrent payload being known to the second source upon deployment of the security campaign.

Clause 12. The security campaign as defined in clause 11 wherein:

the first security deterrent is printed in a predetermined manner; and the second security deterrent is printed relative to the first security deterrent, the first security deterrent providing for the second security deterrent at least one of absolute size calibration, absolute orientation calibration, skew calibration, warp calibration, color calibration, or combinations thereof.

Clause 13. The security campaign as defined in any of clauses 11 and/or 12 wherein the first security deterrent payload is independent of the second security deterrent payload.

Clause 14. The security campaign as defined in any of clauses 8 and/or 11 wherein the first security deterrent is a scrambled first security deterrent in which pieces of the first security deterrent have been labeled and rearranged.

While several embodiments have been described in detail, it will be apparent to those skilled in the art that the disclosed embodiments may be modified. Therefore, the foregoing description is to be considered exemplary rather than limiting.

What is claimed is:

1. A method for creating a security campaign, comprising:
   generating, via a first source, a first security deterrent for at least one non-security purpose including calibration of an other unrelated security deterrent;
   transmitting the first security deterrent to a second source;
   generating, via the second source, a second security deterrent for a security purpose;
   incorporating the first and second deterrents into a single security campaign such that the first security deterrent is physically separate from the second deterrent and is used for calibration of the second deterrent; and
   embedding information in the first security deterrent, the second security deterrent, or both the first and second security deterrents such that any information embedded in the first security deterrent is independent and unknown to the second source and any information embedded in the second security deterrent is independent and unknown to the first source.

2. The method as defined in claim 1 wherein incorporating is accomplished by:
   printing the first security deterrent in a predetermined manner such that the printed first security deterrent provides for the printed second security deterrent at least one of absolute size calibration, absolute orientation calibration, skew calibration, warp calibration, color calibration, or combinations thereof; and
   printing the second security deterrent in a predetermined manner relative to the printed first security deterrent.

3. The method as defined in claim 1, further comprising:
   receiving, at the first source, a data stream from the second source; and
   determining whether the data stream should be incorporated into the first security deterrent.

4. The method as defined in claim 3, further comprising:
   deciding that at least a portion of the data stream should be incorporated into the first security deterrent; and
   linking the at least the portion of the data stream to the first security deterrent in a manner that is unknown to the second source upon deployment of the security campaign.

5. The method as defined in claim 1, further comprising:
   dividing the first security deterrent into a predetermined number of pieces;
   labeling each of the pieces;
   rearranging the labeled pieces, thereby forming a scrambled first security deterrent; and
   incorporating the scrambled first security deterrent into the single security campaign instead of the first security deterrent, wherein the scrambled first security deterrent is physically separate from the second security deterrent and is used for calibration of the second security deterrent.

6. The method as defined in claim 1 wherein generating the second security deterrent includes combining a plurality of security deterrent patterns together.

7. The method as defined in claim 1, wherein embedding the information includes:
   encoding a first data stream into the first security deterrent, the first data stream being unknown to the second source upon deployment of the security campaign; and
   encoding a second data stream into the second security deterrent, the second data stream being known to the second source and being unknown to the first source upon deployment of the security campaign.

8. A single security campaign formed by the method of claim 1,
   the single security campaign comprising:
   the first security deterrent printed in a predetermined manner;
   the second security deterrent printed relative to and physically separate from the first security deterrent, the first security deterrent providing for the second security deterrent at least one of absolute size calibration, absolute orientation calibration, skew calibration, warp calibration, color calibration, or combinations thereof; and
   information embedded in the first security deterrent, the second security deterrent, or both the first and second security deterrents, wherein any information embedded in the first security deterrent is independent and unknown to the second source and wherein any information embedded in the second security deterrent is independent and unknown to the first source.

9. The security campaign as defined in claim 8 wherein the second security deterrent includes a plurality of color tiles, and wherein each color tile indicia of the second security deterrent is a payload indicia.

10. The security campaign as defined in claim 8 wherein the information is a data stream encoded in the first security deterrent in a manner that is unknown to the second source upon deployment of the security campaign.

11. The security campaign as defined in claim 8 wherein the information includes:
    a payload encoded in the first security deterrent, the first security deterrent payload being known to the first source and unknown to the second source upon deployment of the security campaign; and
    a payload encoded in the second security deterrent, the second security deterrent payload being known to the second source and unknown to the first source upon deployment of the security campaign.

12. The security campaign as defined in claim 8 wherein the first security deterrent is a scrambled first security deterrent in which pieces of the first security deterrent have been labeled and rearranged.

13. A security campaign method, comprising:
    deploying an object including a security campaign printed thereon, the security campaign including:
    a first security deterrent;

a payload encoded in the first security deterrent, the first security deterrent payload being known to a first source and unknown to a second source upon deployment of the object;

a second security deterrent physically separate from the first security deterrent and providing calibration for the first security deterrent; and a payload encoded in the second security deterrent, the second security deterrent payload being known to the second source and unknown to the first source upon deployment of the object; and revealing, via the first source, the first security deterrent payload in response to at least one of the following: a recall event, an audit event, or an event in which forensic analysis beyond analysis of the second security deterrent is required.

14. The method as defined in claim 1 wherein the first security deterrent includes a plurality of sub-deterrents.

15. The method as defined in claim 14 wherein each of the plurality of sub-deterrents has a different pattern.

16. The method as defined in claim 14, further comprising arranging the plurality of sub-deterrents in a configuration that provides any of absolute size calibration or absolute orientation calibration for the second security deterrent.

17. The security campaign as defined in claim 8 wherein the first security deterrent includes a plurality of sub-deterrents, each of the plurality of sub-deterrents having a different pattern.

18. The security campaign as defined in claim 17 wherein the plurality of sub-deterrents is arranged in a configuration that provides at least one of the absolute size calibration or the absolute orientation calibration for the second security deterrent.

* * * * *

UNITED STATES PATENT AND TRADEMARK OFFICE
CERTIFICATE OF CORRECTION

PATENT NO.         : 8,453,941 B2  
APPLICATION NO.    : 13/125780  
DATED              : June 4, 2013  
INVENTOR(S)        : Steven J Simske et al.

It is certified that error appears in the above-identified patent and that said Letters Patent is hereby corrected as shown below:

In the Claims:

In column 10, line 42, in Claim 9, delete "indicia of" and insert -- of --, therefor.

Signed and Sealed this  
Thirteenth Day of August, 2013

Teresa Stanek Rea  
*Acting Director of the United States Patent and Trademark Office*